US006251354B1

(12) United States Patent
Greenwell et al.

(10) Patent No.: US 6,251,354 B1
(45) Date of Patent: Jun. 26, 2001

(54) PROCESS FOR RECOVERING SODIUM NITRITE

(75) Inventors: Robert E. Greenwell, Mount Vernon; Thomas Link Guggenheim, Mt. Vernon; Norman Enoch Johnson, Mount Vernon; Roy Ray Odle, Mt. Vernon, all of IN (US); Jimmy Lynn Webb, Ballston Lake, NY (US)

(73) Assignee: General Electric Co., Pittsfield, MA (US)

( * ) Notice: Subject to any disclaimer, the term of this patent is extended or adjusted under 35 U.S.C. 154(b) by 0 days.

(21) Appl. No.: 09/285,927

(22) Filed: Apr. 2, 1999

(51) Int. Cl.[7] .......................... C01B 21/20; C07D 405/00

(52) U.S. Cl. .......................... 423/385; 548/473; 548/456

(58) Field of Search .......................... 423/385; 548/473, 548/456

(56) References Cited

U.S. PATENT DOCUMENTS 4,956,057 * 9/1990 Stucki et al. .......................... 204/101
5,068,353 * 11/1991 Dellacoletta et al. ............... 548/461

* cited by examiner

*Primary Examiner*—Joseph K. McKane
*Assistant Examiner*—Joseph Murray

(57) ABSTRACT

The present invention provides a process for recovering a metal nitrite, e.g., sodium nitrite, from a reaction mixture formed from an aromatic displacement reaction such as the synthesis of an aromatic bis(ether phthalimide) in an organic non-polar solvent. The process comprises forming a reaction mixture from the synthesis of an aromatic bis(ether phthalimide) comprising a recoverable amount of metal nitrite; treating the reaction mixture with an amount of water effective to produce an aqueous solution phase of metal nitrite and an organic non-polar phase; and separating the aqueous solution phase of metal nitrite from the organic non-polar phase.

38 Claims, No Drawings

PROCESS FOR RECOVERING SODIUM NITRITE

CROSS-REFERENCE TO RELATED APPLICATIONS

Not applicable.

FEDERALLY SPONSORED RESEARCH

Not applicable.

BACKGROUND OF THE INVENTION

1. Field of the Invention

The invention relates to a process for recovering sodium nitrite, potassium nitrite, lithium nitrite, or nitrite mixtures containing at least one of the foregoing from the reaction mixture resulting from the synthesis of a polyimide such as, for example, an aromatic bis(ether phthalimide).

2. Brief Description of the Related Art

Sodium nitrite may be produced as a reaction by-product in aromatic displacement reactions such as the synthesis of aromatic bis(ether phthalimide) compounds. Synthesis of these compounds has been described in U.S. Pat. No. 5,068,353 to Dellacoletta. Of particular interest is the product of sodium nitrite as the reaction by-product of the synthesis of bisimide having the formula (I).

(I)

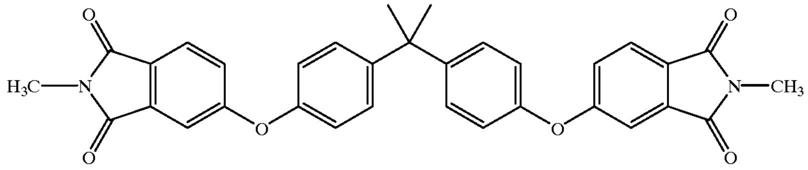

Several techniques have been used to recover bisimide from a reaction mixture including solid-liquid separation techniques such as filtering at a temperature at which the bisimide is substantially completely soluble while alkali metal salt impurities are substantially insoluble. (See U.S. Pat. No. 5,068,353.)

Bisimide has also been recovered by extractive purification employing a conventional caustic wash as the extractant. In this process, bisimide in the toluene reaction solvent is extracted with a sodium hydroxide wash to remove the sodium nitrite, unreacted starting materials, catalyst and other reaction by-products. A disadvantage to this method is that the sodium hydroxide also hydrolyzes some of the bisimide product, converting it to aqueous, soluble amide-acid sodium salts. (See U.S. Pat. No. 5,068,353.)

The sodium hydroxide wash, containing the bulk of the sodium nitrite present in the reaction mixture, is typically disposed of by concentrating and burning in an incinerator or is disposed of through biotreatment. The organic materials in the wastewater (i.e., the sodium hydroxide wash) are destroyed and the sodium nitrite is converted to nitrogen and sodium carbonate in the burning process. A disadvantage to this process is the violent, uncontrollable nature of the reaction due to the high amounts of organic impurities present in the sodium hydroxide wash. As the sodium nitrite by-product can itself be marketed, it would be advantageous to recover the sodium nitrite from the reaction mixture in sufficient purity to be marketable.

What is needed in the art is a method for recovering useable sodium nitrite from the reaction mixture formed from the synthesis of aromatic bis(ether phthalimides).

SUMMARY OF THE INVENTION

The process of the present invention comprises forming a reaction mixture comprising one or more products including a recoverable amount of a metal nitrite, preferably at least one of sodium nitrite, lithium nitrite, and potassium nitrite, in a non-polar solvent; treating the reaction mixture with a polar solvent in an amount effective to produce two phases comprising an aqueous solution phase of the metal nitrite and an organic non-polar phase; and separating the aqueous solution phase from the organic non-polar phase.

Various features and advantages of the present invention will be appreciated and understood by those skilled in the art from the following detailed description.

DETAILED DESCRIPTION OF THE INVENTION

The present invention provides a process for recovering lithium nitrite, potassium nitrite, sodium nitrite, or mixtures containing at least of the foregoing from a reaction mixture formed from the synthesis of a polyimide. For ease of discussion, the present application will discuss the process of the present invention as it applies to the recovery of sodium nitrite from a reaction mixture formed from the synthesis of bisimide, wherein the reaction mixture comprises a recoverable amount of sodium nitrite, bisimide, unreacted material, and by-products and impurities, dissolved in a non-polar organic solvent. The reaction mixture is thus referred to as non-polar.

For example, bisimide is synthesized by reacting 4-nitro-N-methylphthalimide of the formula (II):

(II)

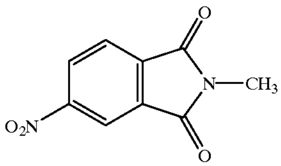

with bisphenol A disodium salt of the formula (III)

(III)

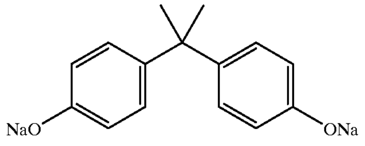

in a non-polar solvent, such as refluxing toluene, in the presence of a phase transfer catalyst.

Suitable non-polar organic solvents useful in the present invention include solvents in which the major reaction product, bis(ether phthalimide), is soluble and sodium nitrite is insoluble. Some possible solvents include, but are not limited to, toluene, xylene, trimethylbenzene, dichlorobenzene, chlorobenzene, anisole, and higher hydrocarbon solvents including dodecane.

Meanwhile, preferred phase transfer catalysts include quaternary ammonium salts and phosphonium salts including bis(tri-n-butyl)-1,6-hexylene diammonium dibromide, tetrapropylammonium bromide, tetrabutylammonium chloride, tetrabutylammonium fluoride, tetrabutylammonium acetate, tetrabutylphosphonium bromide, tetraphenylphosphonium bromide and hexaethylguanidinium chloride, among others, with hexaethylguanidinium chloride catalyst of the formula (IV):

(IV)

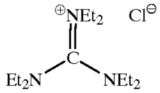

particularly preferred.

The resulting reaction mixture comprises, for example, the major reaction product, bisimide, along with sodium nitrite, the minor reaction product monoimide of the formula (V):

(V)

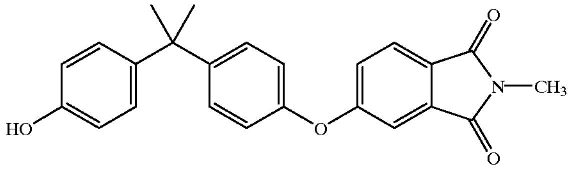

unreacted starting material, catalyst, such as hexaethylguanidinium chloride, and by-products having the formulas (VI):

(VI)

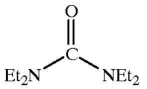

and $H_2NEt_2$ (diethylamine), wherein "Et" is an ethyl group, along with unidentified organic impurities.

In order to separate the sodium nitrite from the reaction mixture, a polar solvent, typically water, is added to the reaction mixture in an amount effective to dissolve the sodium nitrite, resulting in two immisible phases: for example, an aqueous phase comprising an aqueous solution of sodium nitrite and a small amount of organic materials, typically less than about 3 percent by weight ("wt %") organic materials based upon a combined weight of organic materials, catalyst, and sodium nitrite; and an organic non-polar phase comprising bisimide, catalyst, reaction by-products and impurities, which are not appreciably soluble in water, dissolved in a non-polar solvent. The amount of water added is tailored to produce the desired percent solution of sodium nitrite according to customer requirements or the subsequent purification technique to be used. Typically, up to about 45 wt % sodium nitrite solution based on the total weight of aqueous solution, is desirable for most purification techniques, with about 10 wt % to about 42 wt % sodium nitrite preferred, and about 37 wt % to about 42 wt % especially preferred. The pH of the water utilized is general about neutral with deionized water often preferred.

Dissolution of the sodium nitrite in water can optionally be facilitated via the addition of heat. A dissolution temperature can readily be selected empirically by one of skill in the art based on the choice of solvent, with such temperature typically between about 25° C. and about 110° C. For example, for reactions in which the non-polar organic solvent is toluene, a temperature of about 70° C. to about 85° C. is preferred.

Once the two phases have reached equilibrium, the aqueous solution of sodium nitrite is readily separated from the non-polar reaction mixture, typically by drawing out the sodium nitrite solution through the bottom of the reaction vessel. The separated aqueous sodium nitrite solution is herein referred to as the "water wash" to distinguish from the conventional caustic wash. At this point, the sodium nitrite is sufficiently free of organic material such that it may be marketed as is or subjected to further purification techniques.

The determination of whether further purification techniques will be employed is based upon the desired purity of the sodium nitrite, and the yield of the reaction mixture employed. High yield reaction mixtures are required to achieve a clean separation between the organic non-polar phase and the aqueous phase. If the reaction yield is not sufficiently high, bisphenol A disodium salt will be present in the aqueous solution in higher quantities than those found in high yield mixtures. Furthermore, solid bisphenol A or its sodium salt will also be present, floating in the aqueous sodium nitrite solution. Consequently, the bisimide yield based on 4-nitro-N-methylphthalimide and bisphenol A disodium salt is preferably above about 90%, more preferably above about 97.5%, and most preferably above 98%. For reactions providing less than or equal to 90% yield of bisimide, filtration is employed to remove precipitated bisphenol A disodium salt or bisphenol A from the aqueous phase.

The purification process may be any suitable purification technique or combination of techniques, including passing the aqueous sodium nitrite solution through a filter such as a semi-permeable membrane, subjecting the recovered aqueous sodium nitrite solution to carbon treatment, resin treatment, melt treatment, biotreatment, high temperature and high pressure treatment, or any other appropriate conventional technique or combination of techniques that removes residual organic material.

For example, melt purification typically comprises isolating a sample of aqueous solution comprising a minimal amount of organic impurities, preferably below about 3 wt % based on the combined weight of organic materials and sodium nitrite; removing the water, and melting the sodium nitrite crystals in a slow and controllable purification at temperatures up to 500° C., decomposing impurities in the dried sodium nitrite. The melt purification of the present invention is conducted without a resulting violent reaction, due to the low amounts of organic material present in the aqueous solution. In contrast, the conventional caustic wash reacts quickly and violently at a temperature of about 300° C. and is extremely hazardous. This explosive reaction is believed to be due to the conventional caustic wash comprising higher quantities of organic matter, typically about 20 wt % based on the combined weight of organic materials and sodium nitrite.

Alternatively, the water wash can be processed through commercially available membranes to filter out organic material. In membrane processing, organic material is selectively rejected from the membrane and is reconcentrated in the recirculating feed to the membrane. Filtering can more readily be accomplished with the process of the present invention than with the conventional caustic wash process due to the fact that the usual pH of a conventional caustic wash is about 13–14, which is not readily tolerated by the majority of available commercial membranes. Some possible membranes which can be employed with the present invention include a Desal membrane available from Desal Corporation, and a LCI membrane available from LCI Corporation, with the Desal membrane typically preferred due to a 400% increase in filtration rate.

Yet another purification technique comprises purification by resin treatment, with the use of cross-linked resins, such as cross-linked polystyrene resins, particularly preferred because they are readily available, economical, and chemically stable allowing reuse.

Alternatively, a process similar to that taught in U.S. Pat. No. 5,709,800 can be employed, where the aqueous solution is subjected to a temperature and pressure sufficient to remove impurities from the aqueous sodium nitrite solution by converting the residual organic material in the solution to sodium carbonate and low molecular weight biodegradable materials. The preferred temperatures are those at which the reaction is rapid, while pressures are selected based upon the desired temperature. Suitable temperatures typically include about 300° C. to about 400° C., more preferably about 350° C. to about 380° C. Suitable pressures include pressures of about 1,000 pounds per square inch (psi) to about 4,000 psi, more preferably about 2,000 psi to about 3,500 psi.

All references cited herein are hereby incorporated in their entireties.

The following examples are provided to illustrate the process according to the present invention. It should be understood that the examples are given for the purpose of illustration and do not limit the invention.

EXAMPLE 1

Two identical reaction mixtures were prepared by reacting about 287 kilograms ("kg") (632 pounds "lbs") of bisphenol A disodium salt and about 434 kg (958 lbs) of 4-nitro-N-methylphthalimide in about 1,919 kg (4,230 lbs) of toluene in the presence of about 2.7 kg (6 lbs) of hexaethylguanidinium chloride catalyst to produce a reaction mixture comprising bisimide dissolved in toluene, other reaction products and impurities, and a recoverable amount of sodium nitrite. Sample 1 was treated according to the process of the present invention using about 208 liters (55 gallons) of water to dissolve the sodium nitrite producing a 40 wt % aqueous solution of sodium nitrite based on total weight of solution, i.e., water wash. Sample 2 was treated with about 643 liters ("L") (170 gallons) of an aqueous solution of 1 wt % sodium hydroxide based on the total weight of solution. In each example, the contents of the vessel were agitated for about 5 minutes at about 82° C. to dissolve the sodium nitrite. The reaction mixtures were allowed to settle for about 25 minutes before the water wash and conventional caustic wash were each drummed off through the appropriate valve.

Table 1 provides a compositional comparison between the water wash and the conventional caustic wash.

TABLE 1

| | Sample Nos. | |
|---|---|---|
| Parameter | 1 | 2 |
| Flow rate (gph) | 156 | 417 |
| Ph | 8 to 12 | 13 to 14 |
| Density | 1.3 | 1.17 |
| sodium nitrite (wt %) | 40 | 22 |
| organics (wt %) | 0.8 to 1.0 | 2.0 to 2.8 |
| Total organic carbon (TOC) | 5500 | 13000 |
| hydrolyzed bisimide (wt %) | 0.2 | 1 |
| hydrolyzed monoimide (wt %) | 0.01 | 0.26 |
| BPA salt (wt %) | 0.01 | 0.3 |
| 4-nitrophthalic acid (wt %) | 0.1 | 0.26 |
| 4-nitrophthalamide acids (wt %) | 0.1 | 0.26 |
| HEG-Cl (wt %) | 0.37 | 0.28 |
| sodium chloride (wt %) | 0.43 | 0.18 |
| organic unknowns (wt %) | 0.2 | 0.26 |

gph is gallons per hour.

As can be seen from Table 1, treatment of the reaction mixture according to the process of the present invention provides a sodium nitrite solution having 40 wt % sodium nitrite based on the total weight of solution compared with 22 wt % sodium nitrite obtained with the conventional caustic wash. The total organic carbon content (TOC) in the water wash is 5500 ppm by weight compared with 13,000 ppm by weight of TOC for the conventional caustic wash.

EXAMPLE 2

Separate reaction mixtures were prepared for Samples 3–6 and Samples 7–10 by reacting about 434 kg (958 lbs) of 4-nitro-N-methylphthalimide with about 287 kg (632 lbs) of bisphenol A disodium salt in about 1,919 kg (4,230 pounds) of toluene in the presence of about 2.7 kg (6 lbs) of hexaethylguanidinium chloride catalyst to produce a reaction mixture comprising bisimide dissolved in toluene, other reaction products and impurities, and a recoverable amount of sodium nitrite. For Samples 3–6, the reaction mixture was treated with 55 gallons of water according to the process of the present invention. For Samples 7–10, the reaction mixture was treated with about 643 L (170 gallons) conventional caustic wash comprising 1 wt % aqueous solution of sodium hydroxide. For all examples, the contents of the vessel were agitated for about 5 minutes at about 82° C. to dissolve the sodium nitrite. The reaction mixture was allowed to settle for about 25 minutes.

Table 2 provides a compositional comparison between Samples 3–6 and Samples 7–10.

TABLE 2

| Constituent | Sample Nos. Water Wash Process 3 | 4 | 5 | 6 | Caustic Wash Process 7 | 8 | 9 | 10 |
|---|---|---|---|---|---|---|---|---|
| Bisimide Yield of reaction mixture (mol %) (based on BPA) | 98.69 | 98.8 | 98.7 | 98.45 | 99.18 | 97.96 | 98.66 | 98.69 |
| Bismide Yield of reaction mixture (mol %) (based on NPI) | 99.64 | 99.5 | 98.3 | 99.38 | 99.02 | 99.46 | 99.39 | 99.58 |
| Total organic carbon in aqueous phase (ppm by wt.) | 5,300 | 4,430 | 5,400 | 5,465 | 11,930 | 13,636 | 11,377 | 13,100 |
| Sodium nitrite in aqueous phase (wt %) | 42.6 | 37.8 | 39.4 | 41.1 | 23.6 | 20.6 | 19.6 | 19.5 |
| pH of aqueous phase | 10 | 10 | 11 | 10 | >13 | >13 | >13 | >13 |
| 4-nitrophthalamide acid in aqueous phase (mg/L) | 1063 | 1254 | 2539 | 2193 | 1954 | 848 | 385 | 950 |
| 4-nitrophthalic acid in aqueous phase (wt %) | 769 | 1160 | 1528 | 1412 | 1210 | 1128 | 651 | 913 |
| Bisphenol A Disodium salt in aqueous phase (mg/L) | 48 | 23 | 58 | 68 | 4400 | 10,252 | 5,658 | 7,689 |
| Hydrolyzed monoimide in aqueous phase (mg/L) | 86 | 130 | 50 | — | 4516 | 2167 | 2854 | 4465 |
| Hydrolyzed bisimide in aqueous phase (mg/L) | 2,072 | 1,557 | 771 | 429 | 11,930 | 13,635 | 10,039 | 13,138 |

As can be seen in Table 2, the water wash obtained according to the process of the present invention comprises a 37.8 wt % to 42.6 wt % sodium nitrite solution with lower levels of organic material than present in the conventional caustic wash.

In addition to the sodium nitrite recovery process, the present inventive process gives an added benefit in that it also results in a reduction in the amount of bisimide product yield that is lost during the bisimide extraction process (i.e., the sodium nitrite recovery process). As can be seen in Table 1, the water wash comprises 0.2 wt % bisimide, as compared with 1 wt % bisimide in the conventional caustic wash.

EXAMPLE 3

Membrane treatment using a pilot unit was performed for Samples 11–14 (See Table 4). Typical operating conditions of the pilot unit were 400 psi pressure on the feed stream at a temperature of about 30° C. The feed rate was 4 gallons per minute using a membrane that has 17.2 square feet of surface area contained in a standard cylindrical housing. This pilot unit was used to process Samples 11–14.

In Samples 11 and 12, a 100-gallon sample of water wash was processed with membrane treatment using a Desal 5 membrane. The permeate flow on the Desal 5 membrane was about 400 milliliters per minute ("mL/min"). An advantage of the present invention is the ability to a more cost efficient membrane that permeates faster but only withstands a pH of about 8 to about 12. The lower pH of the water wash does away with the necessity of selecting a slower membrane for its ability to withstand the higher pH of conventional caustic wash.

In Samples 13 and 14, a 100-gallon sample of water wash was processed with membrane treatment using an LCI membrane. The permeate flow on the LCI membrane was about 40 mL/min.

Table 4 illustrates the further reduction in organic content achieved by membrane treatment of water wash as compared with membrane treatment of conventional caustic wash.

TABLE 4

| Sample No./ stream | TOC (ppm by wt) | $NaNO_2$ (mg/L) | 4NAA (mg/L) | 4NPA (mg/L) | BPA (mg/L) | H-MI (mg/L) | H-BI (mg/L) | pH |
|---|---|---|---|---|---|---|---|---|
| 11[a] | 4610 | 40.1 | 1230 | 917 | 98 | 68 | 690 | 10 |
| 11[b] (Desal) | 1635 | 40.2 | 654 | 270 | 10 | — | — | 10 |
| 11[c] | 14,880 | 36.9 | 3,638 | 3,600 | 117 | 771 | 4149 | 11 |
| 12[a] | 5,019 | 37.8 | 1,253 | 1,160 | 23 | 130 | 1557 | 11 |
| 12[b] (0% filtered) | 425 | 43.7 | 107 | 65 | 7 | 0 | 16 | 11 |

TABLE 4-continued

| Sample No./ stream | TOC (ppm by wt) | $NaNO_2$ (mg/L) | 4NAA (mg/L) | 4NPA (mg/L) | BPA (mg/L) | H-MI (mg/L) | H-BI (mg/L) | pH |
|---|---|---|---|---|---|---|---|---|
| (LCI) 12[b] (50% filtered) | 562 | 37.9 | 158 | 99 | 7 | 0 | 21 | 11 |
| (LCI) 12[b] (85% filtered) | 1,101 | 41.4 | 328 | 247 | 10 | 0 | 85 | 11 |
| (LCI) 13[d] | 17,218 | 16.6 | 1,045 | 1,258 | 10,435 | 3,759 | 13,896 | >13 |
| 13[b] | 1,423 | 24.3 | 265 | 328 | 492 | 27 | 110 | >13 |
| 13[c] | 118220 | 13.8 | 4,727 | 5,501 | 45,945 | 19,693 | 71,609 | >13 |
| 14[d] | 13,985 | 19.5 | 950 | 913 | 7689 | 4,466 | 13,138 | >13 |
| 14[b] | 3,143 | 22.2 | 462 | 554 | 1,237 | 181 | 418 | >13 |
| 14[c] | 95,055 | 21.3 | 2,776 | 2,590 | 30,699 | 21,484 | 63,161 | >13 |

[a]Water First Wash
[b]Permeate
[c]Rejected Stream
[d]Caustic Wash (LCI)

An additional advantage of the present invention is that the water wash can be more readily processed than conventional caustic wash with temperature and pressure such as with the temperature and pressure processing of waste material taught in U.S. Pat. No. 5,709,800.

High temperature and high pressure processing (i.e., temperatures of about 200° C. to about 500° C. and pressures of about 10 atmospheres to about 400 atmospheres) of the water wash results in the nitrite oxidizing the dissolved organic materials, destroying the 4-nitro-N-methylphthalimide and bisphenol A disodium salt, the hydrolyzed bisimide and hydrolyzed monoimide, thus rendering the treated wash more amenable to further purification through biotreatment. This is due to the lesser amount of dissolved organic material present in the treated water wash.

A comparison of the levels of TOC and sodium nitrite remaining after treatment to high temperature and pressure is found in Table 5.

TABLE 5

| composition | time (min) | temp. (° C.) | pressure (psi) | $NaNO_2$ (wt. %) | TOC (ppm by wt.) |
|---|---|---|---|---|---|
| control | — | — | — | 23.4 | 3500 |
| treated | 55 | 380 | 3600 | 23.6 | 1959 |

In a typical denitrification biotreatment process, the material to be treated is contacted with anaerobic bacteria, followed by contact with an aerobic biomass whereby the organic materials are mineralized. The aerobic biomass is then clarified, filtered, and discharged. In order to render a conventional caustic wash amenable to biotreatment, the pH must be adjusted from pH 13 to pH 9, causing precipitation of the bulk of the organic material, primarily bisphenol A disodium salt, hydrolyzed bisimide, and hydrolyzed monoimide. The material is then filtered and the filtrate treated with anaerobic denitrifying bacteria.

The process of the present invention eliminates the need for the pH adjustment and filtration steps, lowering the capital investment and operating costs of a biotreatment process.

The water wash of the present invention can additionally be more economically treated than conventional caustic wash with carbon to further reduce the amount of dissolved organic material.

EXAMPLE 4

In Samples 15–18, a 50 gram sample of water wash was processed with carbon treatment. In Examples 19–22, a 50 gram sample of membrane processed water wash was processed with carbon treatment. Table 6 shows the further reduction in total organic carbon achieved by the carbon treatment of water wash (Samples 15–18) and of permeate of water wash (Samples 19–22).

TABLE 6

| | Sample Nos. | | | | | | | |
|---|---|---|---|---|---|---|---|---|
| Composition | 15 | 16 | 17 | 18 | 19 | 20 | 21 | 22 |
| Carbon (g) | 0 | 0.055 | 0.201 | 0.402 | 0 | 0.05 | 0.204 | 0.401 |
| sample size (g) | | 50 | 50 | 50 | | 50 | 50 | 50 |
| pH | 10 | | | | 10 | | | |
| 4NAA (mg/L) | 1341 | 1191 | 1000 | 778 | 252 | 18 | 142 | 4 |
| 4NPA (mg/L) | 918 | 833 | 809 | 812 | 68 | 63 | 64 | 52 |
| BPA (mg/L) | 59 | 29 | 26 | 24 | 12 | 9 | 10 | 8 |
| H-4MI (mg/L) | 116 | 83 | 32 | 21 | 0 | 0 | 0 | 0 |
| H-BI (mg/L) | 2610 | 2366 | 2018 | 1565 | 0 | 0 | 0 | 0 |
| TOC (ppm) | 5450 | 5007 | 4677 | 3889 | 750 | 655 | 450 | 259 |

The water wash may be further treated with resins, particularly cross-linked resins, to remove quaternary ammonium halides from the water wash. Although any resin capable of absorbing organic material from an aqueous solution can be employed, cross-linked polystyrene resins are particularly preferred. It is contemplated that water wash can be treated with resins more economically than conventional caustic wash by virtue of less organic material being present.

EXAMPLE 5

In Sample 23, a brine solution comprising 914 mL water, 247 grams of sodium nitrite (21% by weight $NaNO_2$), 9.14 grams of a 50% sodium hydroxide solution, 9.08 grams hexaethylguanidinium bromide, and 700 μL toluene was processed with resin treatment.

An adsorption column loaded with 95 grams XAD-4 resin (available from Aldrich Chemical Company, Inc.) was provided. The column was maintained at 20° C. and washed with 1 mL of water. One liter of the brine solution was pumped through the column at 20 mL/min, and the effluent was analyzed to determine the presence of hexaethylguanidinium bromide.

The column was regenerated by washing with water at 4 mL/min. The eluent produced ("water flush") was analyzed to determine the presence of hexaethylguanidinium bromide. It was noted that the first 70–80 mL of water flush eluent constituted brine from the loading cycle and represents the interstitial volume of the packed column. The results of the analyses of the brine solution eluent and water flush eluent are provided in Table 7.

TABLE 7

| Brine (mL) | HeGBr in Brine Eluent (ppm) | Water flush (mL) | HeGBr in Water Flush Eluent (ppm) |
|---|---|---|---|
| 200 | 0.65 | 40 | 5267 |
| 350 | 0.51 | 70 | 4990 |
| 450 | 0.33 | 80 | 11150 |
| 500 | 0.76 | 90 | 31725 |
| 550 | 7.73 | 100 | 41274 |
| 600 | 20.6 | 110 | 41582 |
| 650 | 67.4 | 120 | 35113 |
| 700 | 126 | 130 | 28399 |
| 750 | 208 | 140 | 24980 |
| 800 | 369 | 150 | 20113 |
| 850 | 560 | 160 | 18850 |
| 900 | 769 | 180 | 10045 |
| 950 | 1040 | 200 | 11890 |
| 1000 | 1133 | 220 | 9867 |
| | | 240 | 8532 |
| | | 270 | 7177 |
| | | 300 | 6006 |
| | | 360 | 4682 |
| | | 400 | 4035 |
| | | 450 | 3419 |
| | | 500 | 3000 |

EXAMPLE 6

The following example demonstrates the use of the melt purification process.

A 40 wt %, based on total weight of solution, sodium nitrite solution containing about 1 wt % dissolved organic material was provided. The organic material was identified as including hydrolyzed 4-nitro-N-methylphthalimide, hydrolyzed bisimide, and hexaethylguanidinium chloride. The water was removed under vacuum at about 100° C. producing an orange solid. The solid was melted with stirring at about 400° C. for about 1 hour, under 1 pound per square inch (psi) of nitrogen. The solid was then cooled, yielding sodium nitrite comprising less than 7.5 wt % sodium carbonate, 1.18 wt % sodium nitrate and trace amounts of sodium chloride. The melt purification process is accomplished without the accompanying explosive reaction that occurs when sodium nitrite is heated in the presence of relatively large amounts of organic materials due to the minimal amount of organic material present in the aqueous sodium nitrite solution of the present invention.

Another advantageous feature of the present invention is the production of aqueous sodium nitrite solution that is more amenable than conventional caustic wash to purification processes due to the lower amounts of organic impurities present in the aqueous sodium nitrite solution.

Another unexpected advantage of the process of the present invention is the reduced yield loss of bisimide with a water wash as opposed to a conventional caustic wash. For example, a reaction product mixture of 779 grams had a bisimide loss of 524 mg using the water only first wash. For comparison, a reaction product mixture of 760 grams had a bisimide loss of 1369 mg using the conventional caustic first wash. It should be clear that the present invention includes a method for reducing the yield loss of bisimide from a polyimide reaction mixture by washing with a polar solvent, preferably water, before washing with caustic.

While the present invention has been described with reference to particular embodiments thereof, it will be understood that numerous modifications may be made by those skilled in the art without actually departing from the spirit and scope of the invention as defined in the appended claims.

What is claimed:

1. A process for recovering metal nitrite from a reaction mixture, comprising the steps of:

forming a reaction mixture comprising one or more products having a recoverable amount of metal nitrite in a non-polar solvent;

treating the reaction mixture with a polar solvent in an amount effective to produce two phases comprising an aqueous solution phase of metal nitrite and an organic non-polar phase; and separating the aqueous solution phase from the organic non-polar phase.

2. The process according to claim 1, wherein said metal nitrite comprises at least one metal nitrite of the group consisting of sodium nitrite, potassium nitrite, and lithium nitrite.

3. The process according to claim 1, wherein said polar solvent is water.

4. The process according to claim 1, wherein the reaction mixture is treated at a temperature of from about 25° C. to about 110° C.

5. The process according to claim 4, wherein the reaction mixture is treated at a temperature of from about 70° C. to about 85° C.

6. The process according to claim 1, further comprising purifying the aqueous solution phase, wherein said purifying comprises filtration, membrane treatment, carbon treatment, resin treatment, high temperature and high pressure treatment, biotreatment, melt purification, or a combination thereof.

7. The process according to claim 1, further comprising treating the aqueous solution phase with a cross-linked resin.

8. The process according to claim 7, wherein said cross-linked resin is a cross-linked polystyrene resin.

9. The process according to claim 1, further comprising heating the aqueous solution phase to temperatures of about 300° C. to about 400° C. at a pressure of about 1,000 psi to about 4,000 psi.

10. The process according to claim 9, wherein the aqueous solution phase is heated to about 350° C. to about 380° C. at a pressure of about 2,000 psi to about 3,500 psi.

11. The process according to claim 1, wherein the reaction mixture comprises bisimide at a yield of greater than about 90% based on 4-nitro-N-methylphthalimide and bisphenol A disodium salt.

12. The process according to claim 11, wherein said yield is greater than about 97.5% based on 4-nitro-N-methylphthalimide and bisphenol A disodium salt.

13. The process according to claim 12, wherein said yield is greater than about 98% based on 4-nitro-N-methylphthalimide and bisphenol A disodium salt.

14. The process according to claim 1, further comprising the steps of:

agitating the reaction mixture after treating with a polar solvent; and allowing the agitated mixture to reach equilibrium.

15. The process according to claim 1, wherein the aqueous solution phase comprises less than about 3% organic materials based upon a combined amount of organic materials and metal nitrite.

16. The process according to claim 1, wherein said metal nitrite is lithium nitrite.

17. The process according to claim 1, wherein said metal nitrite is sodium nitrite.

18. The process according to claim 1, wherein said metal nitrite is potassium nitrite.

19. A process for recovering metal nitrite from a reaction mixture, comprising the steps of:

forming a reaction mixture from the synthesis of bisimide in a non-polar organic solvent, wherein the reaction mixture comprising a recoverable amount of metal nitrite;

treating the reaction mixture with an amount of water effective to produce an aqueous solution phase of metal nitrite and an organic non-polar phase; and separating the aqueous solution phase from the organic non-polar phase.

20. The process according to claim 19, wherein said metal nitrite comprises at least one metal nitrite of the group consisting of sodium nitrite, potassium nitrite, and lithium nitrite.

21. The process according to claim 19, wherein the reaction mixture is formed by reacting 4-nitro-N-methylphthalimide with bisphenol A disodium salt in the presence of a phase transfer catalyst in an organic non-polar solvent under ether-forming conditions.

22. The process according to claim 21, wherein the organic non-polar solvent is toluene, xylene, trimethylbenzene, dichlorobenzene, chlorobenzene, anisole, and higher hydrocarbon solvents.

23. The process according to claim 21, wherein the organic non-polar solvent is toluene.

24. The process according to claim 21, wherein the phase transfer catalyst is a quaternary ammonium or phosphonium salt.

25. The process according to claim 21, wherein the phase transfer catalyst is bis(tri-n-butyl)-1,6-hexylene diammonium dibromide, tetrapropylammonium bromide, tetrabutylammonium chloride, tetrabutylammonium fluoride, tetrabutylammonium acetate, tetrabutylphosphonium bromide, or tetraphenylphosphonium bromide.

26. The process according to claim 21, wherein the phase transfer catalyst is hexaethylguanidinium chloride, hexaethylguanidinium bromide, or a mixture containing at least one of the foregoing.

27. The process according to claim 21, wherein the reaction mixture is treated at a temperature of from about 70° C. to about 85° C.

28. The process according to claim 21, further comprising agitating the reaction mixture after treating with water to facilitate the production of the aqueous solution phase and the organic non-polar phase.

29. The process according to claim 21, further comprising purifying the aqueous solution phase, wherein said purifying comprises filtration, membrane treatment, carbon treatment, resin treatment, high temperature and high pressure treatment, biotreatment, melt purification, or a combination thereof.

30. The process according to claim 21, wherein the aqueous solution phase comprises less than about 3% organic materials based upon a combined amount of organic materials and sodium nitrite.

31. A process according to claim 21, further comprising melt purifying the aqueous solution phase by forming a sodium nitrite solid from said aqueous solution phase; melting the sodium nitrite solid to remove at least a portion of the organic materials; and cooling the melted solid.

32. The process according to claim 21, wherein the bisimide present in the separated aqueous solution phase is less than or equal to about 0.2 wt % bisimide based on the combined weight of the aqueous solution phases.

33. A process for recovering metal nitrite from a reaction mixture, comprising the steps of:

forming a reaction mixture from the synthesis of bisimide in a non-polar organic solvent, wherein the reaction mixture comprising a recoverable amount of metal nitrite;

treating the reaction mixture with an amount of water effective to produce an organic non-polar phase and an aqueous solution phase of metal nitrite and less than about 3 wt % organic materials based a combined weight of metal nitrite and organic materials in the aqueous solution phase;

separating the aqueous solution phase from the organic non-polar phase; and purifying the aqueous solution phase.

34. The process according to claim 33, wherein said metal nitrite comprises at least one metal nitrite of the group consisting of sodium nitrite, potassium nitrite, and lithium nitrite.

35. A process for reducing the yield loss of a bisimide from a polyimide reaction mixture by washing the polyimide reaction mixture with a polar solvent before washing the polyimide reaction mixture with caustic.

36. The process of claim 35, wherein the polar solvent is water.

37. The process of claim 36, wherein the water has been deionized.

38. The process of claim 35, wherein the polyimide reaction mixture comprises an aromatic bis(ether phthalimide).

* * * * *